United States Patent [19]
Duault et al.

[11] Patent Number: 6,108,336
[45] Date of Patent: Aug. 22, 2000

[54] AAL-5 SSCS FOR AAL-1 AND AAL-2 IN ATM NETWORKS

[75] Inventors: Maurice Duault, St. Laurent du Var; Jean-Francois Le Pennec, Nice, both of France

[73] Assignee: International Business Machines Corporation, Armonk, N.Y.

[21] Appl. No.: 08/934,231

[22] Filed: Sep. 19, 1997

[30] Foreign Application Priority Data

Sep. 26, 1996 [EP] European Pat. Off. ............. 96480099

[51] Int. Cl.[7] .............................. H04L 12/28; H04L 12/56
[52] U.S. Cl. ....................... 370/395; 370/469; 370/474; 714/52; 371/53
[58] Field of Search .................................. 370/230, 231, 370/232, 233, 234, 252, 253, 395, 396, 392, 465, 469, 470, 471, 474, 476, 905; 714/52; 371/53

[56] References Cited

U.S. PATENT DOCUMENTS

| | | | |
|---|---|---|---|
| 5,619,499 | 4/1997 | Nakabayashi | 370/469 |
| 5,742,765 | 4/1998 | Wong et al. | 395/200.6 |
| 5,870,394 | 2/1999 | Oprea | 370/392 |

OTHER PUBLICATIONS

W. Stallings, ISDN and Broadband ISDN with Frame Relay and ATM, p. 113, pp. 478–489, 1995.

*Primary Examiner*—Hassan Kizou
*Assistant Examiner*—Mitchell Slavitt
*Attorney, Agent, or Firm*—G. R. Woods

[57] ABSTRACT

The present invention uses the SAR and CPCS functions of the AAL-5 to define an AAL-5 SSCS for performing the AAL-1 and AAL2 functions. The defined AAL-5 format comprises a SSCS trailer of N (preferred value is 8) bytes an CPCS-PDU of N+8 (preferred value is 16) cells (16×48 bytes=768 bytes). In the preferred embodiment, the AAL-5 CPCS-PDU is transported inside 16 ATM cells. The CPCS and SSCS trailers provide the the same efficiency as AAL-1 and the global structure based on 16 cells is completely similar and transparent in term of delay and overhead. The payload size is 48 bytes for the 15 first cells, and 32 bytes for the last cell. The CPCS-PDU payload size is always a multiple of 8 bytes.

7 Claims, 14 Drawing Sheets

Fig. 4
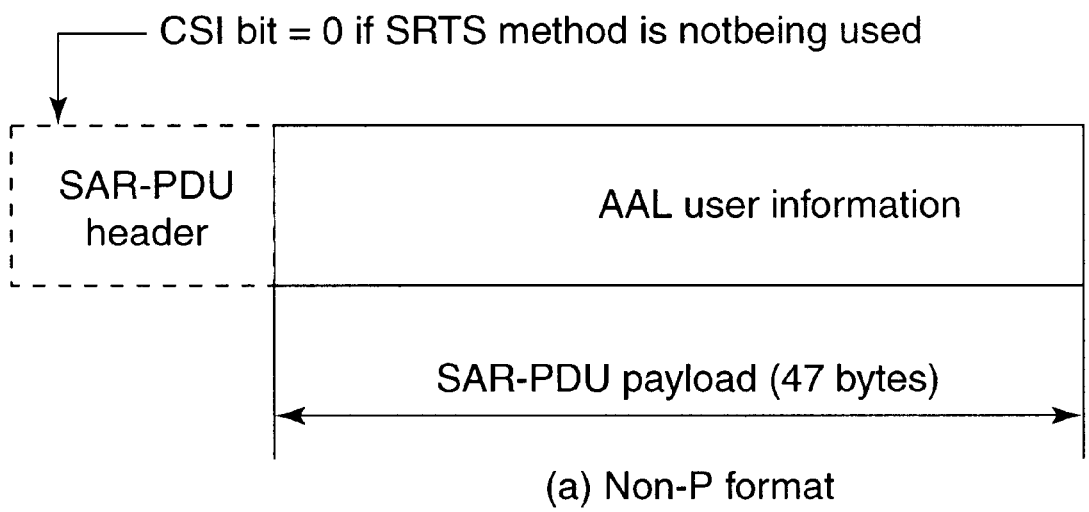
(a) Non-P format
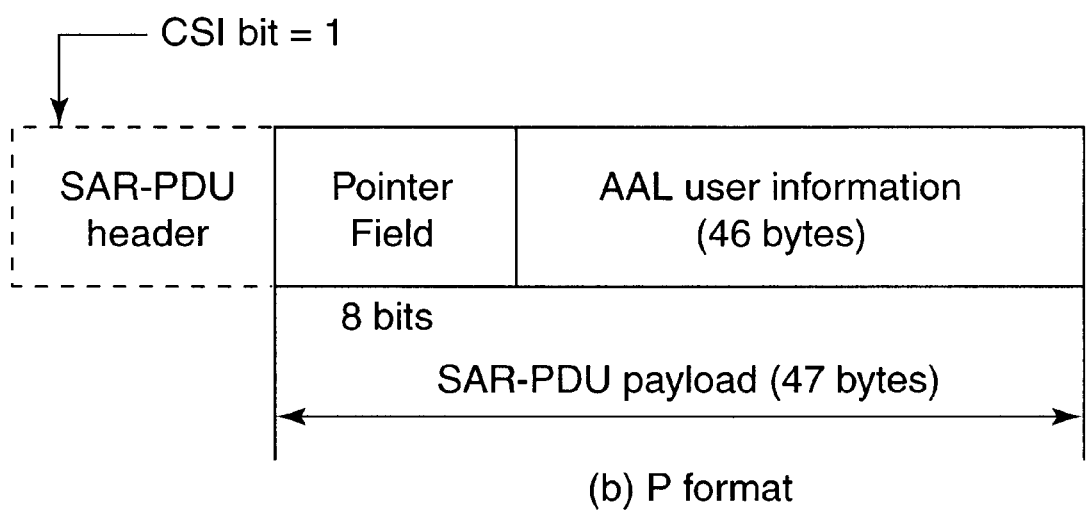
(b) P format

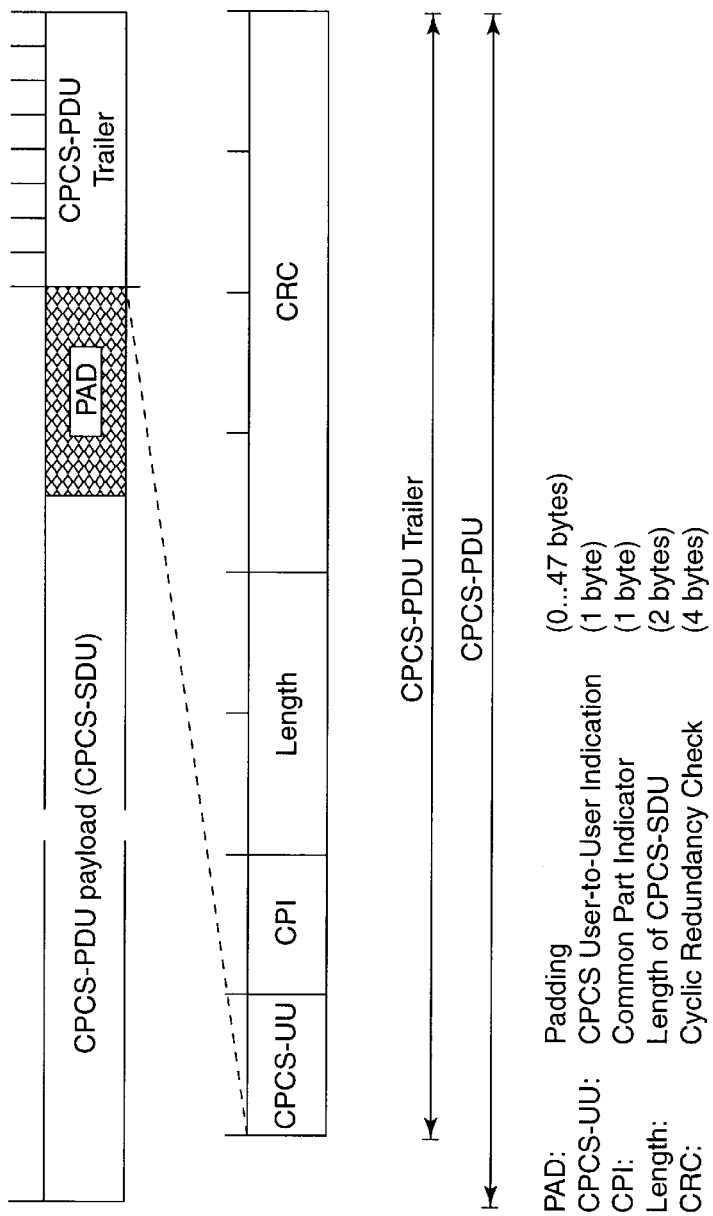
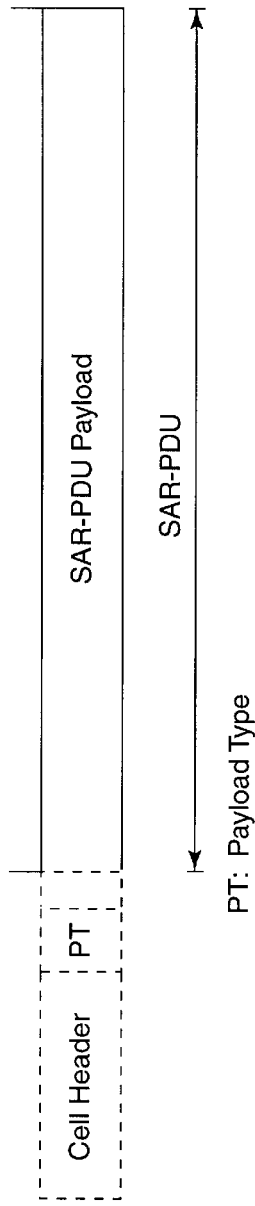
Fig. 6
| PAD: | Padding | (0...47 bytes) |
| CPCS-UU: | CPCS User-to-User Indication | (1 byte) |
| CPI: | Common Part Indicator | (1 byte) |
| Length: | Length of CPCS-SDU | (2 bytes) |
| CRC: | Cyclic Redundancy Check | (4 bytes) |
Fig. 14
PT: Payload Type

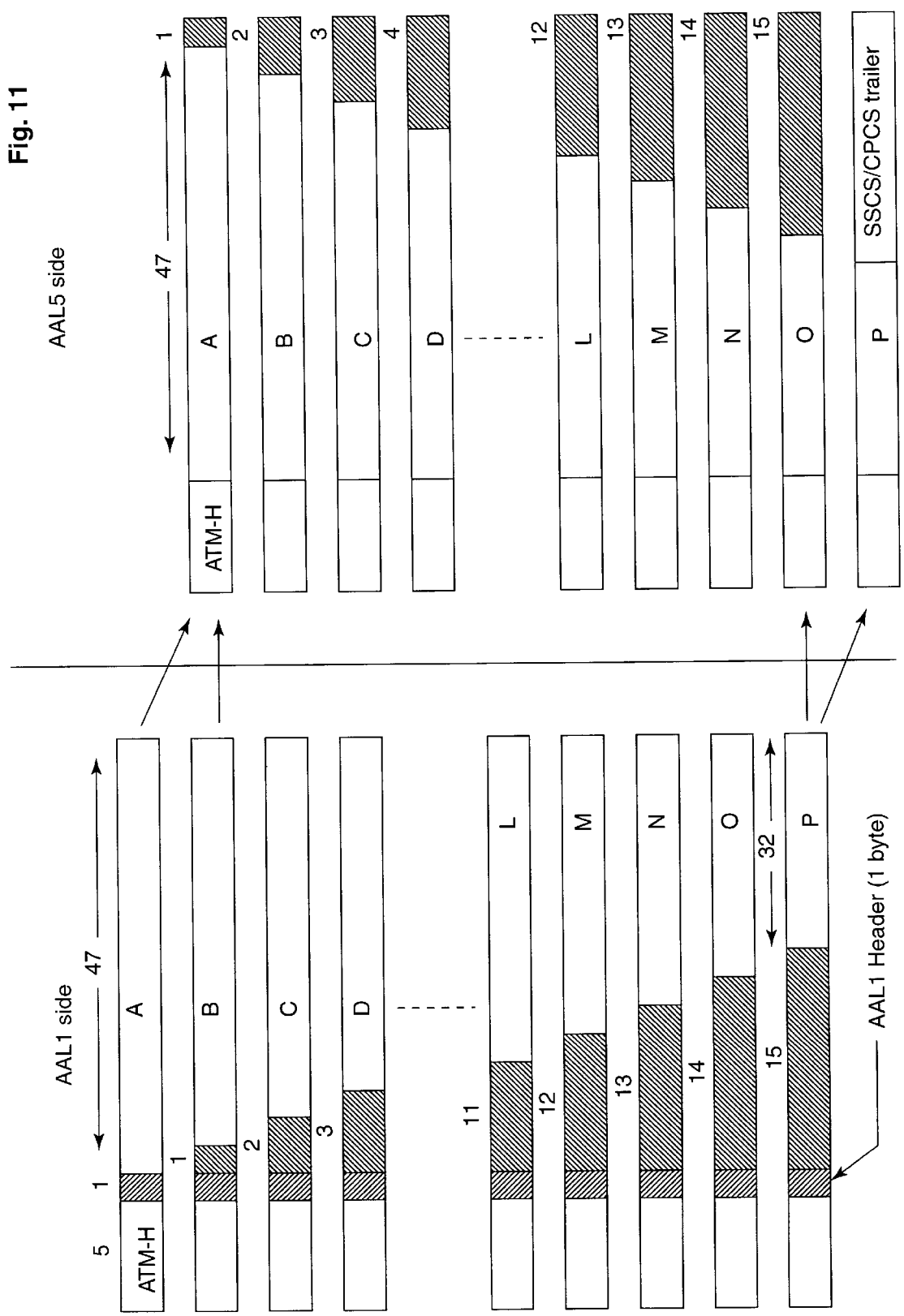

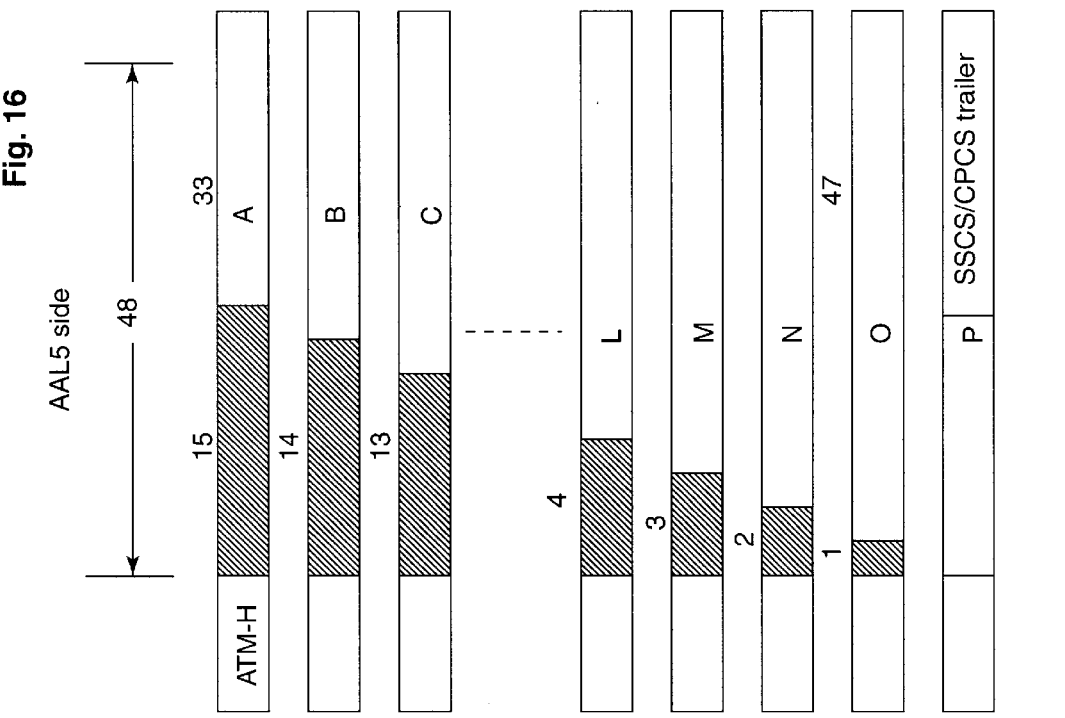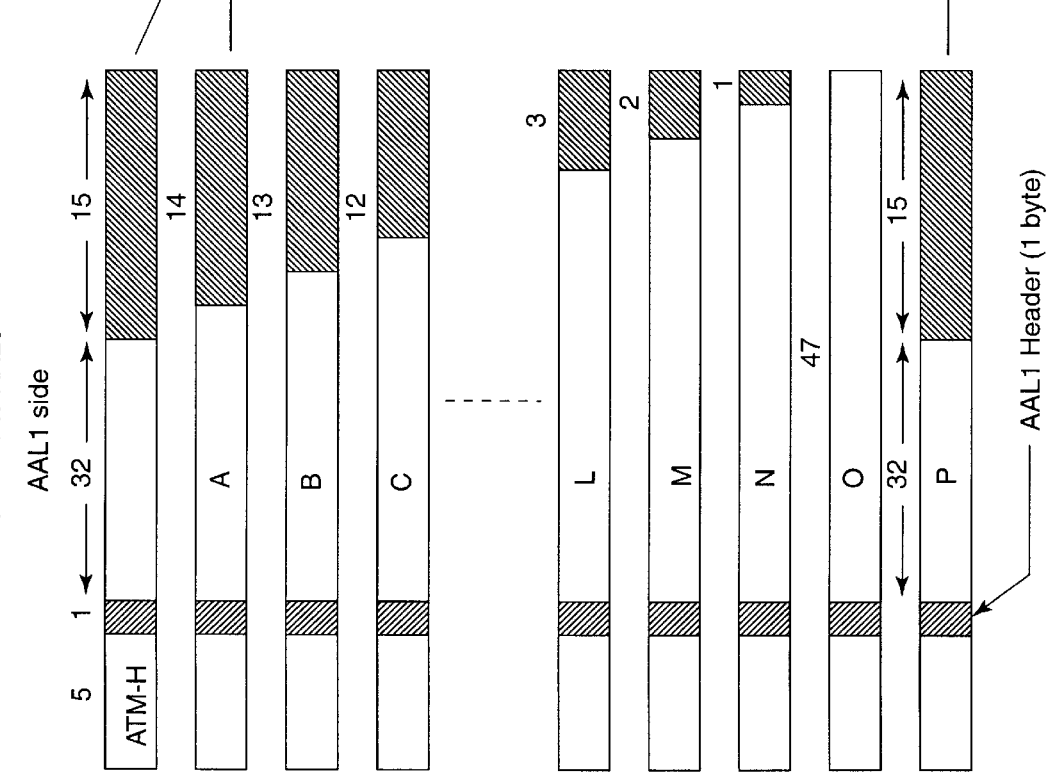
Fig. 16

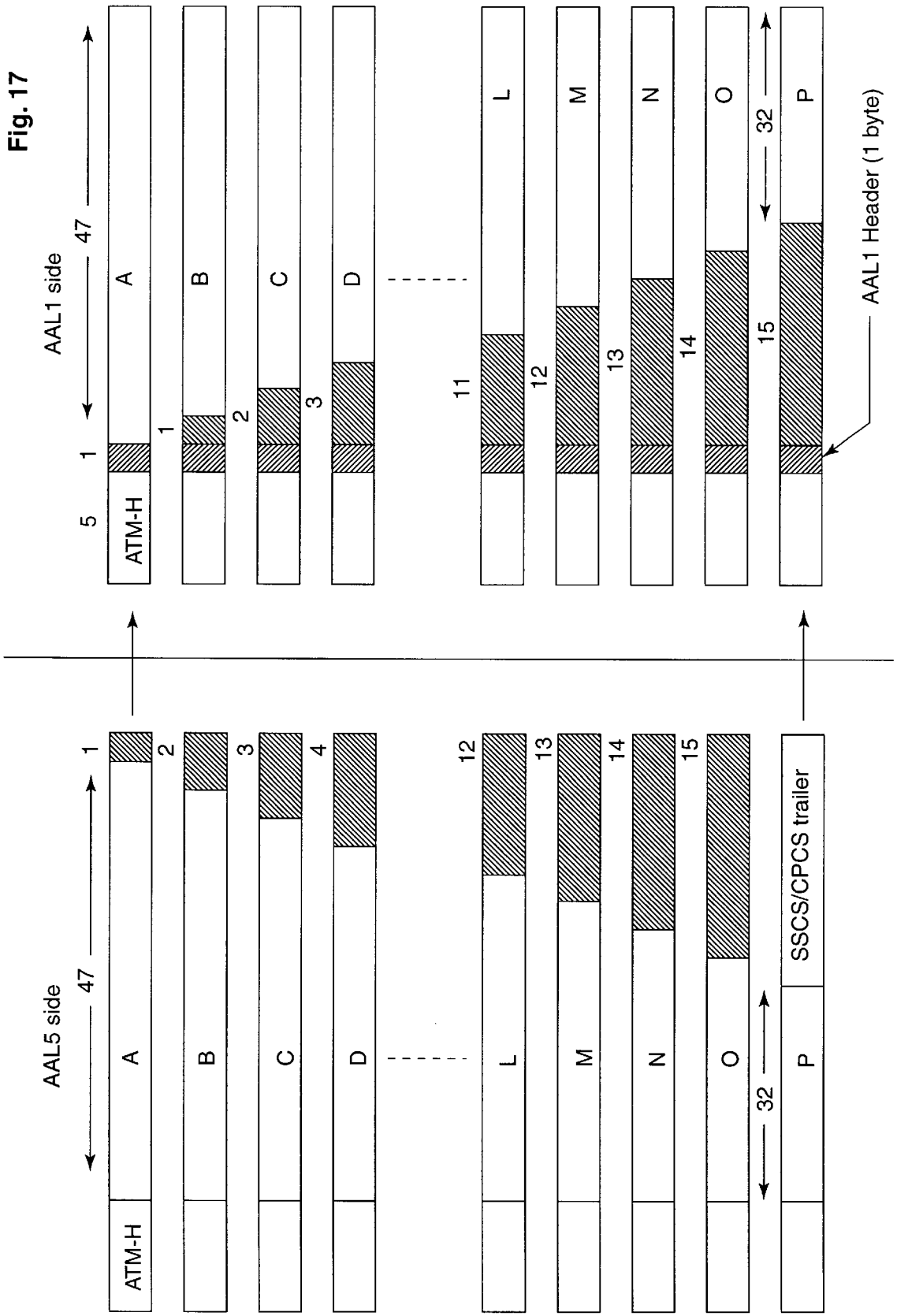

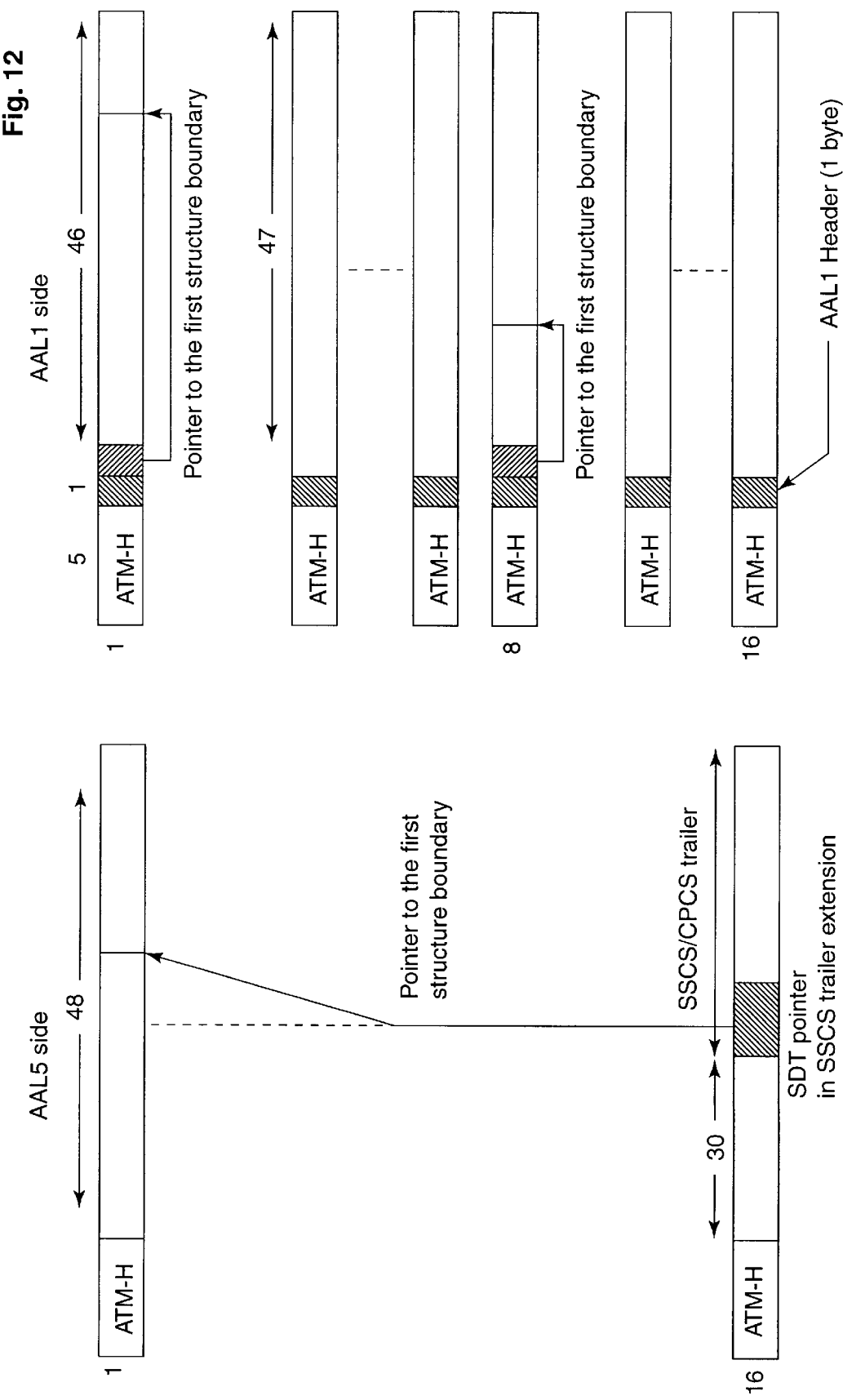

AAL-5 SSCS FOR AAL-1 AND AAL-2 IN ATM NETWORKS

TECHNICAL FIELD

The present invention relates to Asynchronous Transfer Mode (ATM) networks and more particularly to an AAL-5 Service Specific Conveyance Sublayer (SSCS) for supporting AAL-1 and AAL-2 functions.

BACKGROUND ART

Asynchronous Transfer Mode (ATM)

Overview

The "Broadband Integrated Services Digital Network" or B-ISDN is a new telecommunication technology developed by the telecommunications (carrier) industry for both data transmissions (computer) and telecommunications (telephone). This is conceived as a carrier service to provide high speed communications to end users in an integrated way. The technology selected to deliver the B-ISDN service is called "Asynchronous Transfer Mode" or ATM. The almost universal acceptance of ATM comes from the fact, that:

ATM handles all kinds of communication traffic, such as voice, data, image, video, high quality sound, multimedia and many others, and ATM can be used in both the LAN (Local Area Network) and the WAN (Wide Area Network) network environments and hence promises seamless inter-working between the two.

Thus ATM is effective in a much wider range of communications environments than any previous technology. However ATM is a compromise.

ATM does not handle voice as efficiently (or as cost effectively) as does an isochronous network.

ATM does does not handle video as easily as isochronous transfer does (although it is a lot more efficient).

ATM certainly does not handle data as effectively or efficiently as a Packet Transfer Mode or Frame Relay system, and ATM is likely to be problematic in any high error rate environment (such as some slower copper wire connections).

Nevertheless ATM handles all types of traffic adequately and in an integrated way. This means that instead of having a proliferation of many specialised kinds of equipment for different functions it is now possible to have a single type of equipment and network which will do everything.

Technology and Market Trends

Communication technologies have realized considerable progress and many potential applications that were not possible before are now becoming accessible and attractive. One of the driving forces behind ATM development is the need for a communication network architecture that could take advantage of the following changes.

High speed rates can now be sustained with very low bit error rates with the maturing of new transmission media and especially of optical fiber.

The very real user demand for data communication services and for ever faster services has caused carriers to look for an integrated way of supplying these services. Running separate and disparate networks is very expensive.

Silicon chip technology has improved to the point where it can be used to build very fast switching systems.

The general belief that integrated packet (or cell) based switching systems are significantly lower in cost than Time Division Multiplexed (TDM) type systems.

The development (again due to improvement in silicon technology) of much faster and lower-cost computer hardware which makes many new applications possible that were not economically feasible before.

ATM Concepts

The principle key concepts of ATM are as follows:

Cells: all information (voice, image, video, data . . . ) is transported through the network in very short, fixed length (48 data bytes plus a 5-byte header) blocks called "cells". The ATM cell size was determined by the CCITT (now called ITU) as a compromise between voice and data requirements.

Routing: information flow along paths (called "virtual channels") is set up as a series of pointers through the network. The cell header contains an identifier that links the cell to the correct path towards its destination. Cells on a particular virtual channel always follow the same path through the network and are delivered to the destination in the same order in which they are received.

Hardware-Based Switching: ATM is designed so that simple hardware based logic elements may be employed at each node to perform the switching. On a link of 1 Gbps, a new cell arrives and a cell is transmitted every 0.43 microsec.

Adaptation: at the edges of the network, user data frames are broken up into cells. Continuous data streams such as voice and video are segmented into cells. At the destination side of the network the user data frames are reconstructed from the received cells and returned to the end user in the form (data frames etc.) that they were delivered to the network. This adaptation function is considered part of the network but is in a higher layer function, which is called ATM Adaptation Layer (AAL).

Error Control: the ATM cell switching network typically only checks cell headers for errors and simply discards cells in error. The adaptation function AAL is external to the switching network and depends somewhat on the type of traffic but for data traffic it usually checks for errors in data frames received and if one is found then it discards the whole frame. At no time does the ATM network attempt to recover from errors by the re-transmission of information. This function is up to the end user devices and depends on the type of traffic being carried and the adaptation layer being used.

Flow Control: an ATM network may have no internal flow control of any kind. The required processing logic is too complex for flow to be control easily accommodated at the speeds involved. Instead ATM typically has a set of input rate controls that limit the rate of traffic delivered to the network.

Congestion Control: there is only one thing an ATM network can do when a link or node becomes congested. Cells are discarded until the problem has been relieved. Some (lower priority) cells can be marked such that they are the first to be discarded in the case of congestion. Connection end-points are not notified when cells are discarded. It is up to the adaptation function or higher-layer protocols to detect and recover from the loss of cells.

Information about ATM and other high speed networks can be found for example in

"High Speed Networking Technology: An Introductory Survey", June 1993, Document Number GG24-3816-01, IBM International Technical Support Center, Raleigh USA.

"Networking Broadband Services (NBBS): Architecture Tutorial", June 1995, Document Number GG24-4486-00, IBM International Technical Support Center, Raleigh USA.

"Asynchronous Transfer Mode (Broadband ISDN): Technical Overview", June 1994, Document Number GG24-4330-00, IBM International Technical Support Center, Raleigh USA.

Information on the ATM Standards can be found in the International Telecommunication Union (ITU) Recommendations.

ATM Adaptation Layer (AAL)

In order to make an ATM network practical it is necessary to adapt the internal network characteristics to those of the various traffic types that will use the network. This is the purpose of the adaptation layer. It would have been possible to leave this function to end-user equipment suppliers but that could mean that many different systems of voice or video coding (all incompatible with one another) would come into use. The function of the adaptation layer is to provide generalised inter-working across the ATM network. In the case of data, the AAL takes frames (blocks) of data delivered to it, breaks them up into cells and adds necessary header information to allow rebuilding of the original block at the receiver.

AAL Service Classes

The ITU has defined four different generic classes of network traffic that need to be treated differently by an ATM network. These classes are designated Class A to Class D. Originally, there were four different "AAL types" proposed—one for each traffic class. This changed during the standards definition process as the problem came to be better understood. The four traffic classes are summarized as follows:

Class A (Circuit Emulation): This is intended for constant rate voice and video applications characterised by:

a constant bit rate at source and destination.

a timing relationship between source and destination.

a connection between end users and the service.

Class B (Variable Bit Rate Services): This is intended for voice and video traffic that is basically isochronous at the level of end-user presentation, but which may be coded as variable-rate information. These services have a variable flow of information, need some timing relationship between the ends of the connection and are connection oriented.

Class C (Connection-Oriented Data): This is traditional data traffic as known in an SNA or X.25 network. These services are connection oriented and have a variable flow of information.

Class D (Connection-Oriented Data): This service is intended to support connectionless networking protocols such as TCP/IP and services that transfer data character by character (such as an "ASCII TWX" terminal).

AAL Types

The AAL function provides a number of end-to-end protocols across the ATM network to provide support for end users of the four identified service classes. There are five different AAL types:

AAL-0: this is the "null" AAL and corresponds to a process that connects the AAL service interface directly to the ATM networking service. AAL-0 was initially proposed to transport Constant Bit Rate (CBR) traffic without an AAL header field. Each cell transports 48 bytes of payload. This AAL is not considered in standards any more.

AAL-1: AAL-1 is used for Class A (Constant Bit Rate) traffic. This means that the input and output to the network is in the form of a constant, timed, stream of bits. In practice this may take the form of data in an SDH (Synchronous Digital Hierarchy) or PDH (Plesiochronous Digital Hierarchy) frame where the frame rate is constant but data exists in different parts of the frame so that it arrives in the network in short bursts with periods of nothing in between. However, the received data stream is continuous and is locked to a timing reference. The functions of the AAL-1 are:

Receiving the data and segmenting it into cells for transport through the network.

Transmitting the data to the end user on the other side of the network with the same timing that it had when it was received.

AAL-2: AAL-2 provides the required services to Class B (Variable Bit Rate) traffic. It processes a stream of data like AAL-1 does with the critical difference that the data stream is variable in rate. Code (compressed) voice and video are the primary examples here. AAL-2 is currently absent from the draft standards.

AAL-3/4: derived from the SMDS (Switched Multi-Megabit Data Service) standard, AAL-3/4 is a high function, relatively complex AAL. One objective of the design was to retain compatibility with SMDS. AAL-3/4 were combined during the standards definition process as it was realised that the same process could perform both functions. AAL-3/4 provides end-to-end transport for both Class C (connection-oriented) and Class D (connectionless) data. Many options are provided:

Message mode and streaming mode,

Assured delivery,

Non-assured delivery,

Blocking and segmentation of data,

Multiplexing of connections,

Multipoint operation.

AAL-5: this AAL provides functions for both Class C and D but is significantly simpler. With the exception of connection multiplexing, AAL-5 has the same list of allowed options as AAL-3/4.

ATM Adaptation Layer 1 (AAL-1)

Public network operators and PBX (Private Branch Exchange) vendors prefer AAL-1 for the transport of Constant Bit Rate (CBR) traffic for the following reasons:

They have worked in standard organisations during years to define the appropriate format and protocols for CBR (Constant Bit Rate) traffic, and agreed that AAL-1 was the right adaptation layer.

AAL-1 has a small overhead of 1 byte per cell. The overhead per ATM cell is 5 bytes for the ATM header, plus 1 byte for the AAL header. This means that the payload is 47 bytes long (53−6 bytes=47 bytes). The transport of one 64 kbit/s channel requires 64×(53/47)=72 kbit/s.

AAL-1 is defined like a tool kit with many optional functions for the transport of voice, modem signals, video, for the multiplexing of 64 kbit/s channels, for the transport of asynchronous clocking in the network and for many additional functions.

However, AAL-1 has the following drawbacks:

47 bytes payload is very inefficient for software implementations. It requires the equivalent of a sampling rate of 5.875 milliseconds for a throughput of 64 kbit/s (One byte at 64 kbit/s corresponds to 125 $\mu$s. For transporting 47 bytes, the system has to maintain a sampling rate of 47×125 $\mu$s=5.875 ms in order to stay isochronous). Workstation system clocks rarely provide this level of resolution, and applications must request either 48 bytes or 46, or alternate between the two, to use the AAL. Workstation buses move data in multiples of at least 16 bits. Moving units of 47 bytes between drivers is awkward and causes unnecessary overhead and delays. Any multiple of 8 bytes in the payload would solve the problems.

The AAL-1 header is not useful in the great majority of cases. Most of the functions like Structure Data Transfer (SDT) or Synchronous Residual Time Stamp (SRTS), are not necessary for a Workstation. SDT and SRTS are mainly devoted to network nodes in order respectively to multiplex various channels within one ATM VP/VC flow (SDT) or to maintain the clock integrity thru the network (SRTS). Multiplexing and clock recovery are complex and expensive functions requiring additional hardware such as buffers or Phase Lock Loops (PLL).

ATM Adaptation Layer 5 (AAL-5)

In August 95, the ATM Forum and the International Telecommunication Union (ITU) agreed that AAL-1 would be the adaptation layer for the transport of 64 Kbit/s PCM voice. In June 96, companies producing Workstations complained against the difficulties of implementing AAL-1—support of 47 bytes payload and of additional unnecessary functions—and succeeded in having AAL-5 specified as an option. Two AAL-5 formats have been discussed:

The first format, as described in FIG. 10, consists of a payload of 40 bytes, and an AAL-5 trailer of 8 bytes. The overhead per ATM cell is then 5 bytes for the ATM header, plus 8 bytes for the AAL trailer. The transport of one 64 kbit/s channel would require 64×(53/40)=85 kbit/s.

The second format, as described in FIG. 15, consists of a payload of 32 bytes, a control field of 8 bytes and an AAL-5 trailer of 8 bytes. The overhead per ATM cell is then 5 bytes for the ATM header, plus 16 bytes for the AAL-5 trailer. The transport of one 64 kbit/s channel would require 64×(53/32)=106 kbit/s.

Both formats have the following advantages:

The AAL-5 function is well known and available in every Workstation. AAL-5 provides services for the support of data, video, and signalling traffic and can be used also for voice.

Additional new trailer formats are easy to implement.

The AAL-5 function is simple and offers very high performances.

However, both formats have the following drawbacks:

The AAL-5 trailer in each ATM cell is source of an important overhead. The AAL-5 is specified with a trailer of 8 bytes per packet (In the AAL terminology, packets are called CPCS-PDU or Common Part Convergence Sublayer—Protocol Data Unit). If the CPCS-PDU fits within one ATM cell, there is an overhead of 8 bytes per cell. If the CPCS-PDU is 2 cells long, there is an overhead of 8 bytes for 2 cells: this is a way to reduce the overhead by a factor of 2. However, the receive side must wait for the reception of the whole packet before sending it to the upper layer, and the delay is increased by a factor two.

If both AAL-1 and AAL-5 are implemented in different ATM equipment, the inter-working between them will be difficult, and adds a 6 ms delay in the transmission. In this case, the Interworking Function must receive 2 payloads of 40 bytes to send a payload of 47 bytes. 6 ms corresponds to the time needed to fill and send an ATM cell with isochronous data: 1 byte each 125 μs corresponding to a 64 kbit/s speed (48 bytes×125 μs=6 ms).

Another problem is the support of real-time Variable Bit Rate (VBR) traffic and more particularly the support of Variable Bit Rate video and voice with silence removal. AAL-2 had been initially designed for this purpose, but the International Telecommunication Union (ITU) has stopped its activity on the subject. The object of the present invention is then to address this type of application.

SUMMARY OF THE INVENTION

The present invention relates to a method for transmitting a Constant Bit Rate (CBR) or Variable Bit Rate (VBR) traffic in a streaming mode using functions of the ATM Adaptation Layer 5 (AAL-5) Common Part Convergence Sublayer (CPCS), in an Asynchronous Transfer Mode (ATM) network comprising a plurality of nodes interconnected with communication links and transmitting said traffic on fixed length ATM Protocol Data Units (ATM-PDUs). The method comprises the steps of:

receiving an ATM-PDU, building a Segmentation and Reassembly Sublayer PDU (SAR-PDUs) by removing the ATM header from the ATM-PDU, building a CPCS Interface Data Unit (IDU) by assembling one or a plurality of SAR-PDUs, delivering the CPCS-IDU not comprising a CPCS-PDU trailer before a complete CPCS-PDU is received, checking the CPCS-IDU including a CPCS-PDU trailer by means of a Cyclic Redundancy Check (CRC) included in the CPCS-PDU trailer:

if the CRC checking determines that the CPCS-IDU is correct:
the CPCS-IDU payload is delivered.
if the CRC checking determines that the CPCS-IDU is incorrect:
the CPCS-IDU payload is delivered,
the CPCS-PDU trailer and predetermined protected fields are ignored.

The predetermined protected fields include a Service Specific Convergence Sublayer SSCS-PDU trailer for performing the functions of AAL-1 or AAL-2 with a SSCS-PDU trailer extention. The SSCS-PDU trailer comprises:

a PDU Sequence Number field incremented for each AAL-5 CPCS-PDU transmitted, a Time Stamp field comprising the sampling instant of the first byte in the CPCS-PDU, a Synchronous Residual Time Stamp (SRTS) field comprising means for having an exact clock available in both ends of a network connection.

The SSCS-PDU trailer extension comprises:

a Structure Data Transfer (SDT) field comprising means for recovering an alignment of structures inside the CPCS-PDU.

The CPCS-PDUs have a length equal to (N+8) ATM-PDU payloads and wherein N is equal to the length in bytes of the SSCS-PDU trailer.

BRIEF DESCRIPTION OF THE DRAWINGS

The invention will be better understood in the following description accompanying the drawings in which:

FIG. 4 describes the AAL-1 format of the SAR-PDU payload for Structured Data Transfer (SDT).

FIG. 6 describes the CPCS-PDU format for AAL-5.

FIG. 14 describes the SAR-PDU format for AAL-5.

FIG. 11 describes a first interworking function from AAL-1 to AAL-5.

FIG. 16 describes a second interworking function from AAL-1 to AAL-5 according to the present invention.

FIG. 17 describes the interworking function from AAL-5 to AAL-1 according to the present invention.

FIG. 12 describes the interworking function for the Structured Data Transfer (SDT) mode according to the present invention.

DESCRIPTION OF THE PREFERRED EMBODIMENT

Structure of ATM Networks

Figure 1:
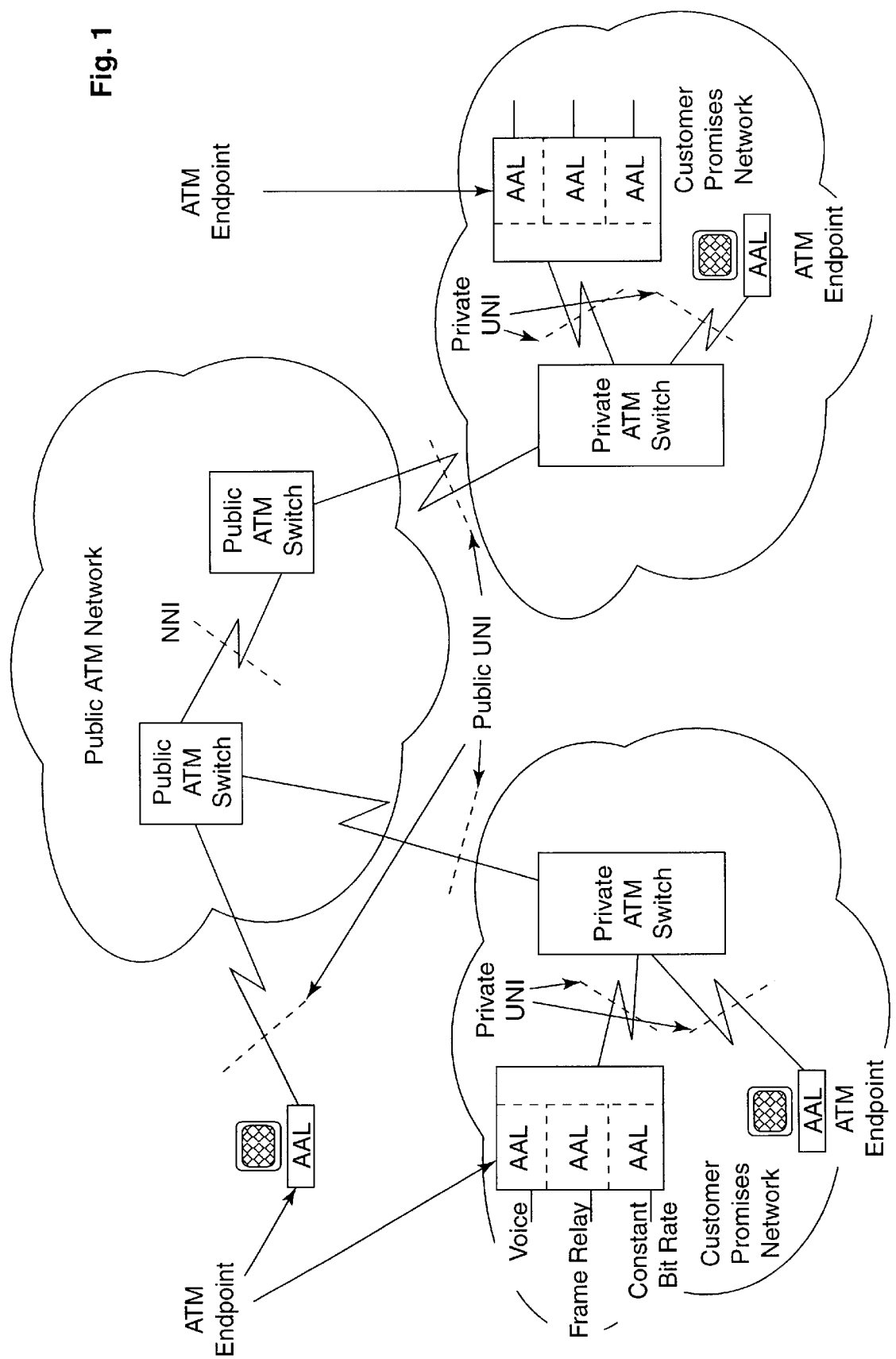
FIG. 1 is an overview of an ATM Network.

The conceptual structure of an ATM network is shown in FIG. 1:

ATM Networks: FIG. 1 shows three quite separate ATM networks—two private and one public. Private ATM networks are sometimes called "Customer Premises Networks" and indeed they will very often be confined to a local area such as a building or a campus. However, a private ATM network can be distributed over a wide area by the use of carrier (non-ATM) links between nodes.

ATM Switches: Four "ATM Switches" are shown in FIG. 1. These perform the backbone data transport with the ATM network. They are usually classified as either "Private ATM Switches" or "Public ATM Switches". Public ATM switches are sometimes referred as Network Nodes (NNs). Private ATM switches are sometimes called Customer Premises Nodes (CPNs).

ATM End-point: The ATM end-point is a piece of end user equipment that interfaces to an ATM network in a native way. An end-point sends and receives ATM cells on link connections defined by ATM standards. An end-point (and only an end-point) contains an ATM Adaptation Layer (AAL) function. An ATM end-point connects to the ATM network over the User Network Interface (UNI).

User Network Interface (UNI): The UNI is specified exactly by the applicable standards. They are two somewhat different UNIs called "public" and "private". The public UNI is for connection of end-user equipment to a public ATM network. The private UNI is for use within a single organisation's premises or for a private network using lines leased from the PTT.

Network Node Interface (NNI) This is the trunk connection between two Network Nodes (NNs). NNI allows the connection of different ATM switches.

Links: They may be one or many physical link connections between the nodes. Links between nodes may be carried as "clear channel" such as over a direct point-to-point connection but may also be carried over an Sonet/SDH connection or over a PDH connection.

ATM Adaptation Layers: End users of an ATM network will be of two kinds:

Those that interface to the ATM network directly through either the public UNI or a private UNI.

Those that do not know anything about ATM and interface using a non-ATM protocol (such as Frame Relay).

In either case a significant amount of logic is required over and above what is provided by ATM in order to use the network productively. For all types of users there are common tasks that must be performed in order to connect to the ATM network. In its definition ATM includes processing for these common tasks. This is called the ATM Adaptation Layer (AAL). The AAL is the real end-user interface to ATM.

ATM Adaptation Layer (AAL)

AAL Sublayer Structure

Figure 2:
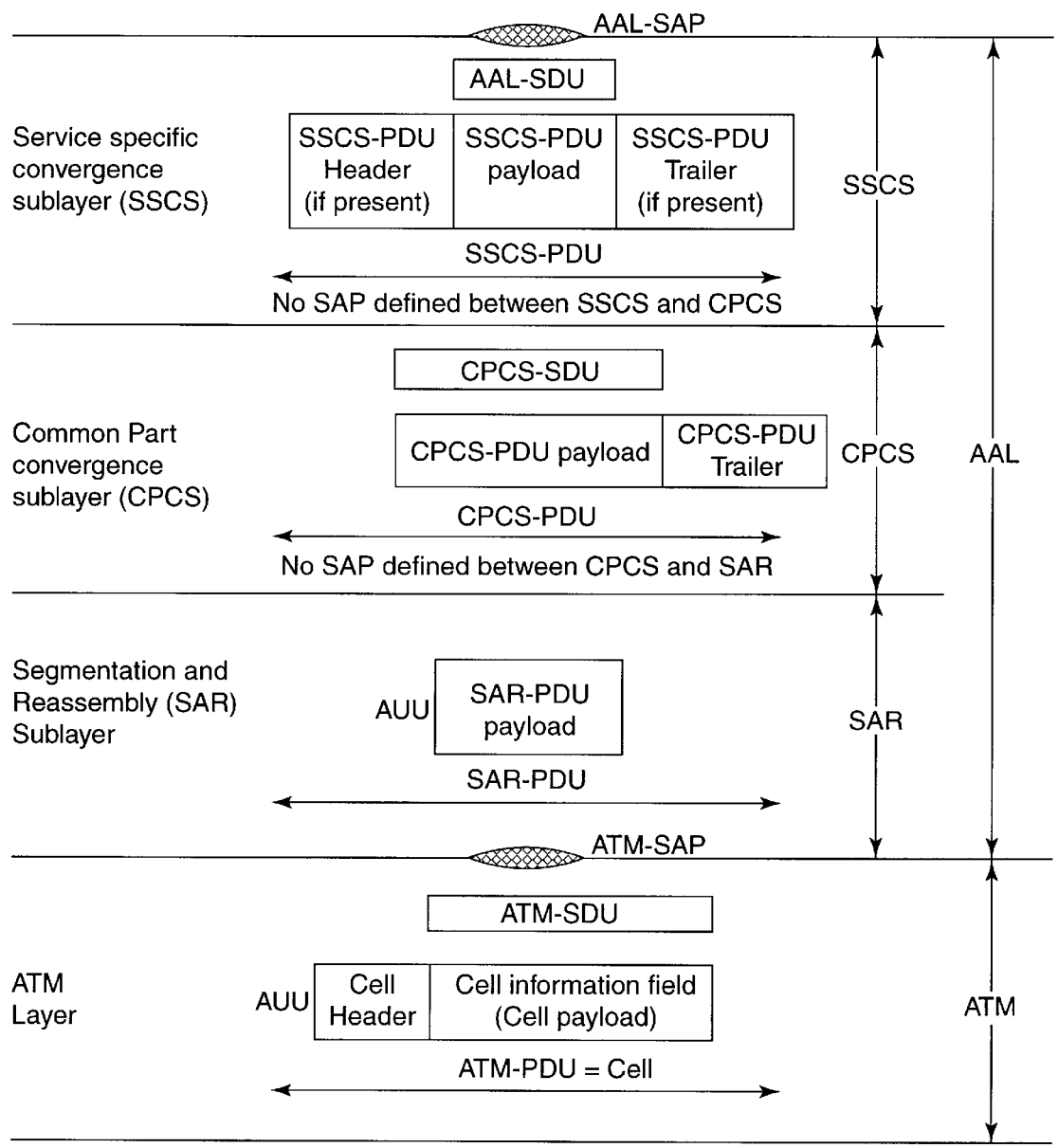
FIG. 2 shows the structure of sublayers and the naming conventions for AAL-5.

The internal structure of AAL-5 is shown in FIG. 2. AAL-1 has a much simpler structure but the principle is the same. The sublayer structure between two Service Access Points (SAP) consists of:

An original Convergence Sublayer (CS) divided into:
   a Service Specific Convergence Sublayer (SSCS) for providing additional functions as required for specific services.
   a Common Part Convergence Sublayer (CPCS) for building header and trailer records onto user data frame. This Sublayer assures integrity at the frame level.

A Segmentation and Reassembly Sublayer (SAR) for taking data and building a stream of 48-byte cells. This sublayer adds cell headers and trailers to provide integrity at the cell level.

The various sublayers cooperate to provide the AAL services from top to bottom on the source side and from bottom to top on the destination side. Sending implies segmentation while receiving implies reassembling data.

As data flows though the AAL and is processed by the different sublayers, it changes its form (has different headers appended and is segmented or reassembled) At different points, data is called by different names:

Service Data Unit (SDU): this is a data as it appears at the interface between a particular layer or sublayer and the layer immediately above. Thus when data is presented to the AAL at its service interface (or Service Access point—SAP) it is called an AAL-SDU. This also applies in the other direction when data is delivered to a user by the AAL at the AAL-SAP.

Interface Data Unit (IDU): a SDU may be segmented into multiple data blocks at an interface and these shorter segments are called IDUs.

Protocol Data Unit (PDU): this is data as it appears at the interface between a particular sublayer and the sublayer immediately below. That is the PDU is an SDU which has the sublayers' protocol information (headers and trailers etc.) appended.

Figure 5:
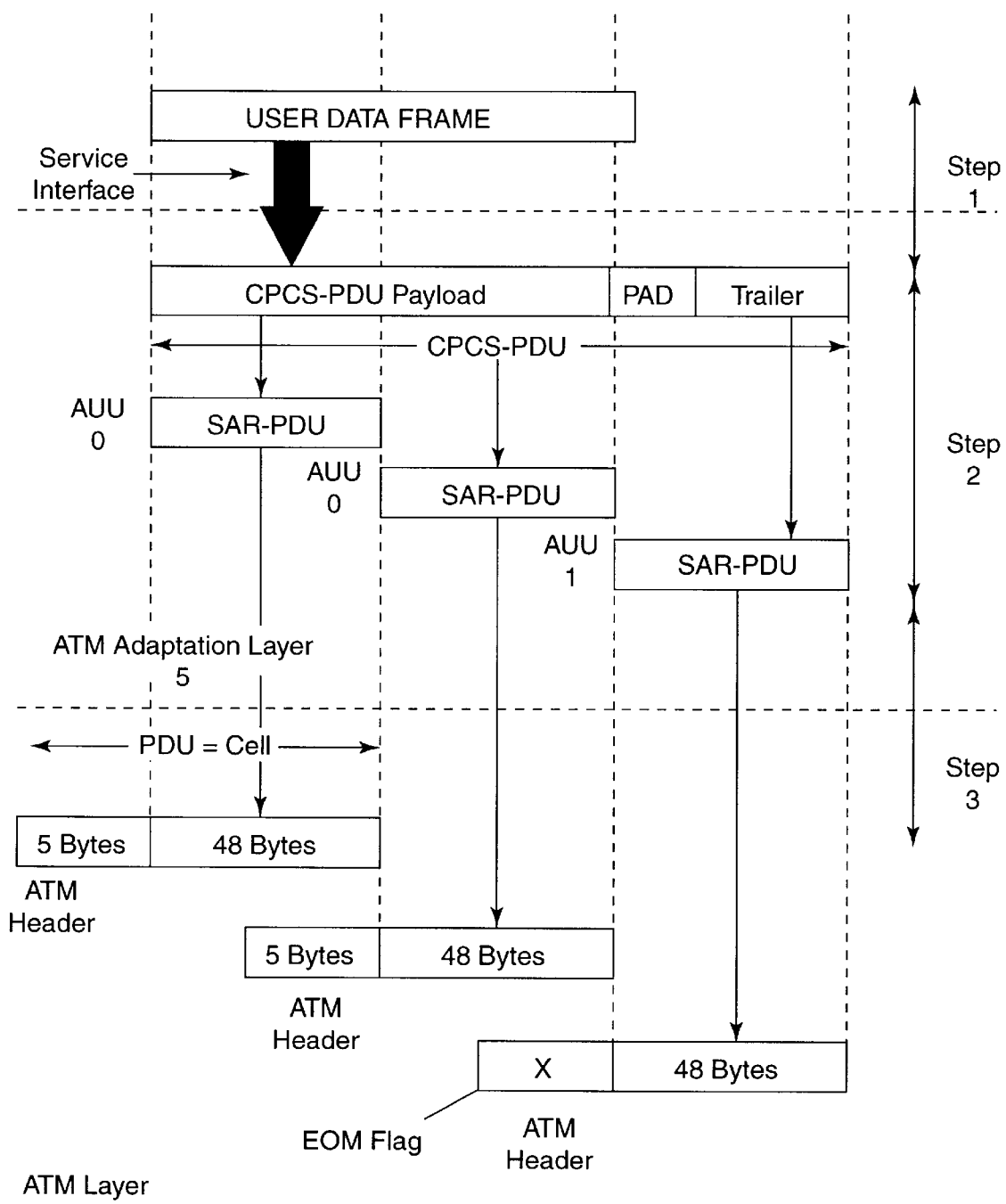
FIG. 5 describes the AAL-5 method of operation.

FIG. 5 shows the flow of data through an AAL at the source end-point (the flow is simply inverted at destination end-point). This figure must be studied in conjunction with FIG. 2. The naming works this way:

A frame of user data is presented to the AAL at the Service Access Point (SAP). At this point the data is called:

an AAL-SDU (the Service Data Unit to be processed by the AAL).

an SSCS-SDU (the Service Data Unit to be processed by the SSCS sublayer).

a CPCS-SDU (if there is no SSCS sublayer and the data unit is to be processed by the CPCS).

When the CPCS sublayer has finished its processing the resultant data unit is called a CPCS-PDU. It is now a Protocol Data Unit because it contains protocol information for the named sublayer.

Now the data is passed to the Segmentation and Reassembly (SAR) sublayer and its name changes immediately. It is now a SAR-SDU. Although it contains protocol information meaningful to the CPCS, this is just data to the SAR and thus viewed from the SAR the data unit is an SDU. So a CPCS-PDU is exactly a SAR-SDU.

When the SAR has finished its processing the resultant (many) data units are called SAR-PDUs.

These are then passed to the ATM layer where they are called ATM-SDUs. They then have their ATM headers appended and are renamed ATM-PDUs or cells for short.

ATM Adaptation Layer 1 (AAL-1)

SAR-PDU Protocol

Figure 3:
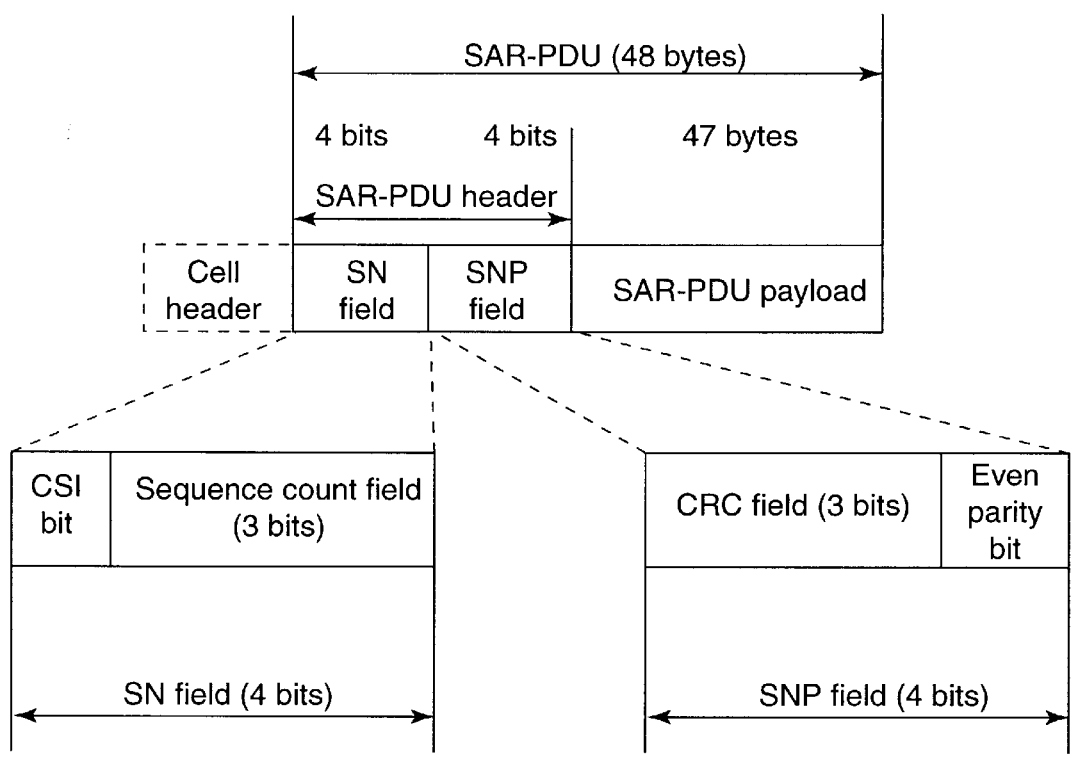
FIG. 3 describes the SAR-PDU protocol for AAL-1.

The SAR-PDU protocol for AAL-1 is shown in FIG. 3. The cell payload starts with two fields of four bits each:

Sequence Number (SN): four-bit

This field contains a three-bit sequence number (SNC) field (which operates in a cyclic fashion) and a one-bit "CS indication" (CSI) bit. The CSI bit is used for a number of purposes depending on the type of traffic.

Sequence Number Protection (SNP): four-bit

This field provides a three-bit CRC (Cyclic Redundancy Check) field to protect against errors in the sequence number (SNC) field and a one-bit even parity (P) field to protect the SAR-PDU header (the parity bit is set such that the 8-bit SAR-PDU header has an even parity).

In operation, data just fills up each cell in turn (up to 47 bytes per cell) and the cell is sent as soon as possible. The data is passed to the AAL across its SAP in blocks which were assembled from the external continuous data stream by an external process.

At the receiver end the reverse takes place. Cells found to have errors in the Sequence Number (SN) field are discarded but no error recovery (by re-transmission) is attempted.

AAL-1 Functions

The major functions of AAL-1 are:

Bit Count Integrity

AAL-1 guarantees that the number of bits sent by the upper layer to the AAL transmit side are equal to the bits transmitted by AAL receive side to the upper layer. This function is performed with a cell sequence number modulo 8 (3 bits) which can take the values from 0 to 7. If one cell is missing, the AAL generates the 47 bytes lost.

Structure Data Transfer (SDT)

SDT permits to transfer a structure of N bytes, and to recover the alignment of the structure. This method applies for the transport of N 64 kbit/s channels inside an ATM connection.

Adaptive Clock (AC) Recovery

AC permits to recover the frequency of one side, and reproduce it at the other side of the ATM network. The method is based on the fill level of the AAL receive buffer. When the buffer tends to be full, the frequency is increased. When the buffer tends to be empty, the frequency is decreased.

Synchronous Residual Time Stamp (SRTS)

SRTS permits to recover the frequency of one side, and to reproduce it at the other side of the ATM network. The method is based on the coding of the frequency difference between the received clock and a network reference in a Residual Time Stamp. This Residual Time Stamp is coded inside the AAL-1 header, and transported to the other side of the network. The same frequency difference is reproduced on the other side of the network.

Forward Error Correction

It is based on Reed-Salomon codes, which are able to correct bytes in error, or lost cells based on the well-known mathematical algorithms from Reed and Salomon.

Synchronous Residual Time Stamp

The 4 bit SRTS is transmitted in the serial bit stream provided by the CSI bit in successive AAL-1 SAR-PDU headers. The modulo 8 sequence count provides a frame structure over 8 bits in this serial bit stream. Four bits of the framed 8 bits are allocated for the SRTS and the remaining 4 bits are available for the Structured data Transfer (SDT). The SAR-PDU headers with the odd sequence count values of 1, 3, 5 and 7 are used for SRTS transport.

Structured Data Transfer (SDT)

Most ATM physical transports use framed physical layer protocols of one kind or another (Sonet/SDH or PDH). Many (or rather most) of these are based on a 125 $\mu$s clock cycle. Structured Data Transfer (SDT) permits multiplexing of multiple channels from a PDH/SDH interface into one ATM connection. It guarantees that the alignment of the structure inside an ATM cell can be recovered.

As shown in FIG. 4, SDT uses an additional header byte in the AAL-1 SAR header (P format). The presence of this header byte is indicated by setting the CSI bit in the SAR header. This additional byte is a pointer (offset from the start of a cell) that indicates where a frame (or other grouping of data) begins. Since the start of a frame may not always be present in a cell, the header byte is not always present either (Non-P format). This pointer is just for synchronisation and the start of each logical grouping has not to be indicated. (Indeed it is possible to have two logical groups in a single cell—as with T1 transport for example—and there is only one pointer.)

ATM Adaptation Layer 2 (AAL-2)

AAL-2 processes a stream of data like AAL-1 does with the critical difference that the data stream is variable in rate. The major functions of AAL-2 are:

Transfer of Service Data Units with a variable bit rate.

Transfer of timing information between source and destination.

The ITU started to define the objectives of AAL-2, but did not define any format and protocol. The work on AAL-2 is stopped for the moment and there is no interworking issue between AAL-2 and AAL-5. One objective of the present invention is to extend the functions of the proposed AAL-5 SSCS in order to address both AAL-1 and AAL-2 functions with the same format and protocol.

ATM Adaptation Layer 5 (AAL-5)

Method of Operation

The AAL-5 operation on transmission described in FIG. 5 is extremely simple:

Step 1:

An AAL-SDU is received at the AAL-SAP.

It may or may not be processed by an SSCS.

The data is passed to the CPCS and becomes a CPCS-SDU. The CPCS appends its control information as a single trailer record and inserts pads so that the length of the new CPCS-PDU is a multiple of 48 bytes. The information present in the CPCS trailer is sufficient to provide assurance that the PDU has been reassembled correctly by the SAR after it has been carried through the network.

The CPCS-PDU is then passed to the SAR and becomes a SAR-SDU.

Step 2

The SAR segments this into 48-byte SAR-PDUs (but note there is no header or trailer information added).

The SAR passes these 48-byte segments to the ATM layer and indicates the last one in the group as a parameter in the call to the ATM layer.

Step 3

The ATM layer builds a 5-byte ATM header and includes the EOM flag in the last SAR-PDU of the SAR-SDU.

The reverse process happens on reception.

The functions provided by CPCS depend on whether the CPCS service user is operating in Message or Streaming Mode Service. Both modes are defined in the ITU standard 1.363.5:

"Message Mode Service

The CPCS-SDU is passed across the CPCS interface in exactly one CPCS-IDU (Interface Data Unit). This service provides the transport of a single CPCS-SDU in one CPCS-PDU.

Streaming Mode Service

The CPCS-SDU is passed across the CPCS interface in one or more CPCS-IDUs. The transfer of these CPCS-IDUs across the CPCS interface may occur separated in time. This service provides the transport of all the CPCS-IDUs belonging to a single CPCS-SDU into one CPCS-PDU. An internal pipelining function in the CPCS may be applied which provides the means by which the sending CPCS-entity initiates the transfer to the receiving CPCS-entity before it has the complete CPCS-SDU available. The Streaming Mode service includes an abort service by which the discarding of the CPCS-SDU partially transferred across the interface can be requested."

Common Part Convergence Sublayer (CPCS)

The CPCS-PDU format is shown is FIG. 6. The meaning of the fields in the CPCS trailer are as follows:

CPCS-PDU Payload (for 1 to 65 535 bytes): In the absence of an SSCS this will be just the data passed to the AAL over the service interface (the AAL-SDU). If an SSCS is present it may perform other functions such as blocking or re-blocking or even transmit protocol data messages of its own. The payload has a maximum length of 65 535 bytes.

Pad (0 to 47 bytes): The CPCS pads out the data frame so that the total length including the CPCS trailer is a multiple of 48 bytes. This is so that the SAR does not have to do any padding of its own. The pad is inserted at the end of the data before the trailer so that the trailer will be in a predictable position when the CPCS is reassembled. This also helps with boundary alignment to speed up processing.

CPCS User to User Indication (CPCS-UU) (1 byte): This is used to pass information from one CPCS to its communicating partner.

Common Part Indicator (CPI) (1 byte): Right now this is zero and exists for boundary alignment but other uses are under study.

Data Length (2 bytes): This tells how much of the received data is CPCS-SDU and how much is pad. It is also a check on the loss (or gain) of cells during transit.

Cyclic Redundancy Check (CRC) (4 bytes): This CRC-32 field provides a validity check on the whole CPCS-PDU except for the CRC itself. The ITU 1.363.5 standard currently defines the following for the Error Detection and Handling functions:

"This function provides for the detection and handling of CPCS-PDU corruption. Corrupted CPCS-SDUs are either discarded or are optionally delivered to the SSCS. The procedure for delivery of corrupted CPCS-SDUs are for further study. When delivering errored information to the CPCS user, an error indication is associated with the delivery. Examples of detected errors would include: received length and CPCS-PDU length field mismatch including buffer overflow, and improperly formatted CPCS-PDU and CPCS CRC error."

Segmentation and Reassembly Sublayer (SAR)

In FIG. 5, the header format for the SAR-PDU is not shown because it does not exist. There is no SAR header or trailer information present in a SAR-PDU. All that the SAR sublayer does is to take the SAR-SDU (CPCS-PDU) and break it up into 48-byte units (before it is passed to the SAR it has been padded to a multiple of 48-bytes in length. In the reverse direction it receives a stream of cells and builds them into a SAR-SDU to pass to the CPCS. As shown in FIG. 14, the SAR does have one bit of header information. This is the last bit of the Payload Type (PT) field of the cell header. It indicates that this cell is the last of a logical group (last cell in the SAR-SDU). The PT field belongs to the ATM header. It conveys the value of the ATM-layer-user to ATM-layer-user (AUU) parameter end-to-end. The value "1" of the AUU parameter indicates the end of a SAR-SDU, the value "0" indicates the beginning or continuation of a SAR-SDU.

AAL-5 Service Specific Convergence Sublayer (SSCS)

The object of the present invention is to use the SAR and CPCS functions of the AAL-5 as described in 1.363.5 and to define an AAL-5 SSCS for performing the AAL-1 and AAL-2 functions.

Method of Operation

The present invention:

Uses the Streaming Mode Service of AAL-5 with delivery of corrupted CPCS-SDU function.

defines two types of CPCS-PDU information:

1. Error sensitive information containing the CPCS and SSCS trailer fields and requiring a valid CRC.

2. Non-Error sensitive information containing the AAL-5 payload. Said payload can be transferred to the upper layer even if the CRC is not valid.

With this mode, the AAL-5 payload in each cell can be transmitted to the upper layer with no additional delay. The SSCS trailer is always in the last cell of the CPCS-PDU and must be protected by an error protection code to guarantee that the information of the trailer is correct. The AAL-5 payload does not need to be protected by an error protection code. The main idea of this invention is to use the standard AAL-5 CRC-32 located in the last cell of the packet for performing a check on the whole AAL-5 CPCS payload to guarantee the integrity of the SSCS trailer:

If the CRC-32 is correct, each field of the AAL-5 PDU is correct.

If the CRC-32 is incorrect, the SSCS and CPCS trailers are incorrect, and are ignored. The next SSCS trailer will be used to perform the appropriate AAL functions. The AAL-5 payload (which does not need any protection) is sent to the upper layer since AAL-5 uses the corrupted delivery mode. Note that AAL-1 does not perform any error detection on the AAL-1 payload and provides a similar function.

This method allows:

the transmission of the first 15 payloads of each 48 bytes to the upper layer before the last cell (the 16th cell) is received, and the reduction to the minimum of the delay associated to the AAL function.

Defines a SSCS trailer of N (preferred value is 8) bytes with an AAL-5 CPCS-PDU of N+8 (preferred value is 16) cells (16×48 bytes=768 bytes). The overhead generated by the CPCS and SSCS trailers is 16 bytes (an average of 1-byte per cell) and is equal to the overhead of the AAL-1. The payload size is 48 bytes for the 15 first cells, and 32 bytes for the last cell. The CPCS-PDU payload size can always be a multiple of 8 bytes.

Note that if the source of the traffic stops, for example at the end of a connection, it is also possible to define a payload of any size.

Defines every AAL-1 and AAL-2 functions with the SSCS trailer fields described in the next section.

SSCS-PDU Format

Figure 7:
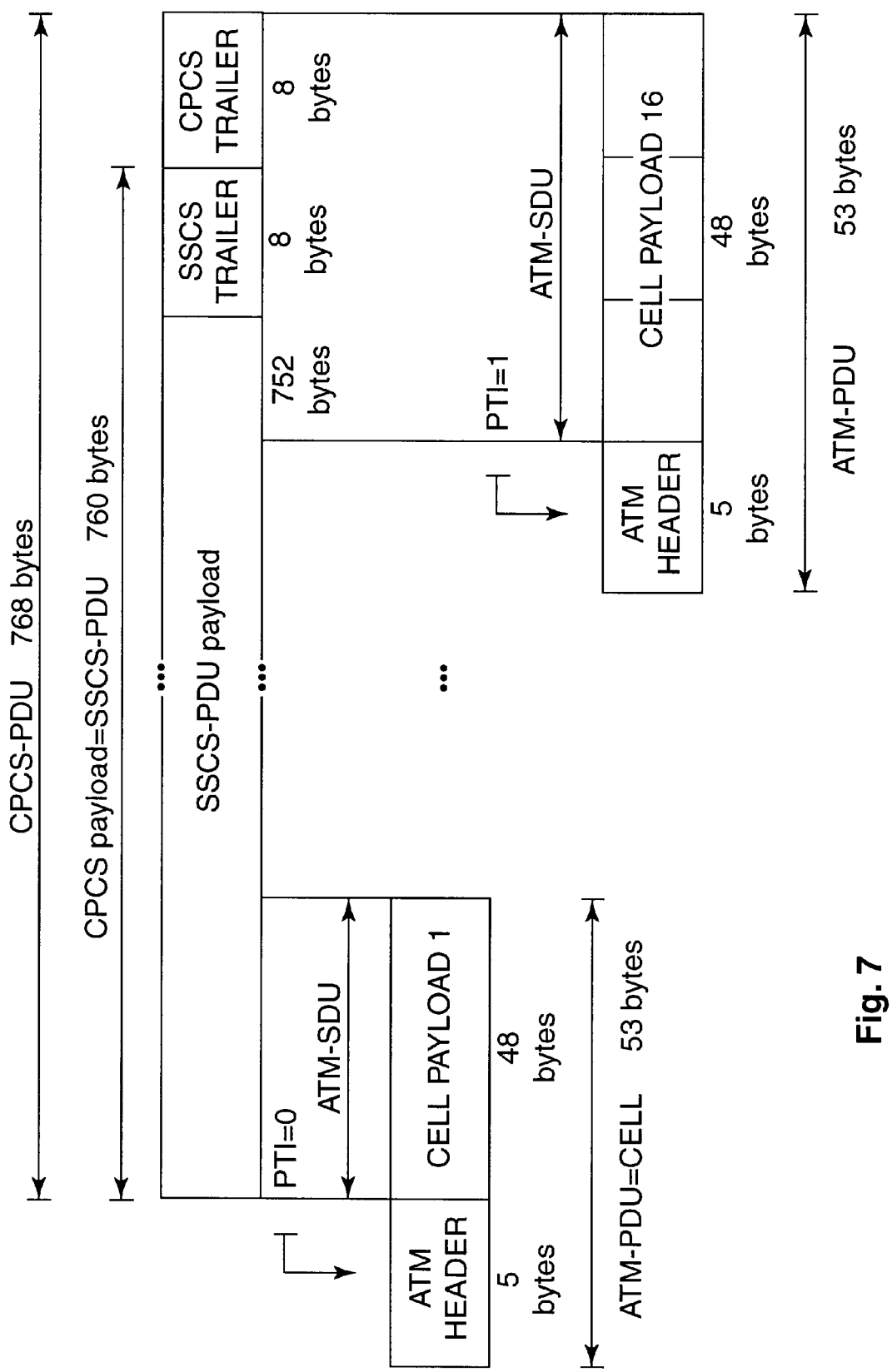
FIG. 7 describes the SSCS-PDU and CPCS-PDU formats for AAL-5 according to the present invention.
Figure 8:
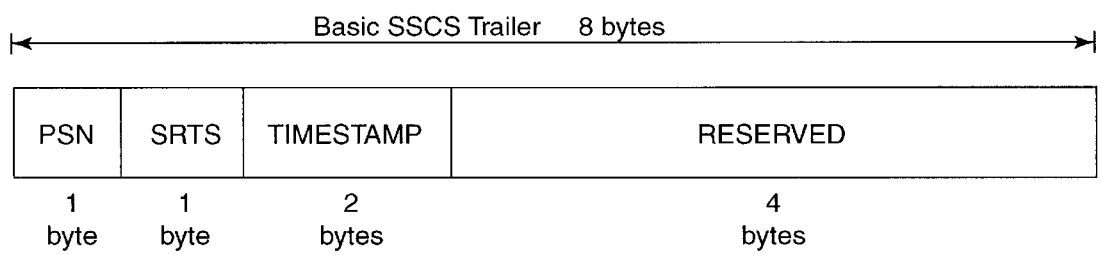
FIG. 8 describes the AAL-5 SSCS trailer for supporting AAL-1 and AAL-2 according to the present invention.

FIG. 7 describes the format of the proposed CPCS-PDU, with the details of the SSCS trailer. In the preferred embodiment, the AAL-5 CPCS-PDU is transported inside 16 ATM cells. It consists of:

a SSCS-PDU Payload ((16×48 bytes)−16 bytes=752 bytes):

a Basic SSCS Trailer (8-byte) which, as described in FIG. 8, comprises the following fields:

PDU Sequence Number (PSN) (1 byte): The PDU Sequence Number is incremented by one for each AAL-5 CPCS-PDU sent, and may be used by the receiver to detect PDU loss and to restore the PDU sequence.

Synchronous Residual Time Stamp (SRTS) (1 byte): AAL-1 sends 1 bit of SRTS every 2 cells. So, every 16 cells, 8 bits are provided which are stored in the one-byte SRTS field of the SSCS trailer. The SRTS function is optional.

Time Stamp (2 bytes): The Time Stamp reflects the sampling instant of the first byte in the CPCS-PDU. The sampling instant must be derived from a clock that increments monotonically and linearly in time to allow synchronisation and jitter calculations. As an example, for audio application, the time stamp clock would likely increment by one for each byte to transfer. If an audio application removes the silences, the time stamp is incremented, regardless of whether the block is transmitted in a packet or dropped as silent.

The Stamp is optional and can be used for asynchronous clocking with Constant Bit Rate (CBR) and Variable Bit Rate (VBR) traffic.

Figure 9:
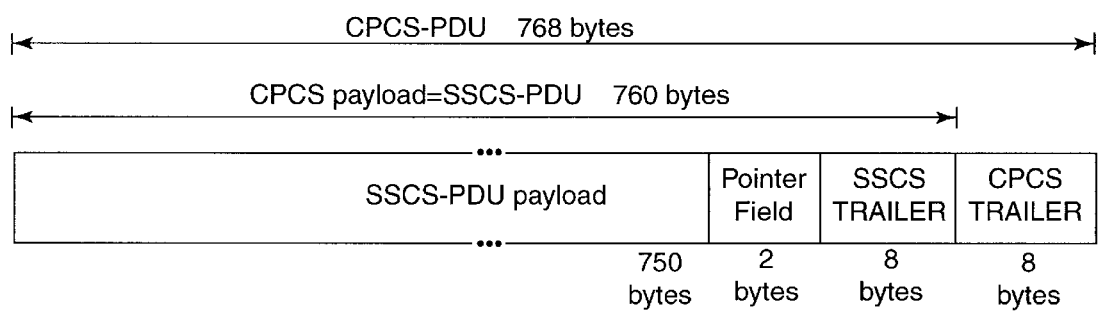
FIG. 9 describes the AAL-5 SSCS trailer extension to support Structure Data Transfer (SDT) according to the present invention.
Figure 10:
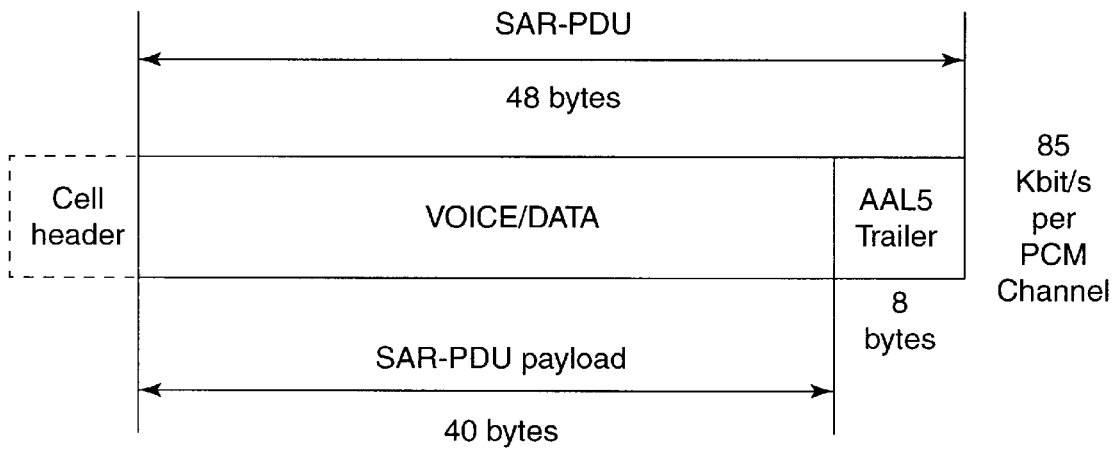
FIG. 10 describes a generally known first AAL-5 proposal to support AAL-1.
Figure 15:
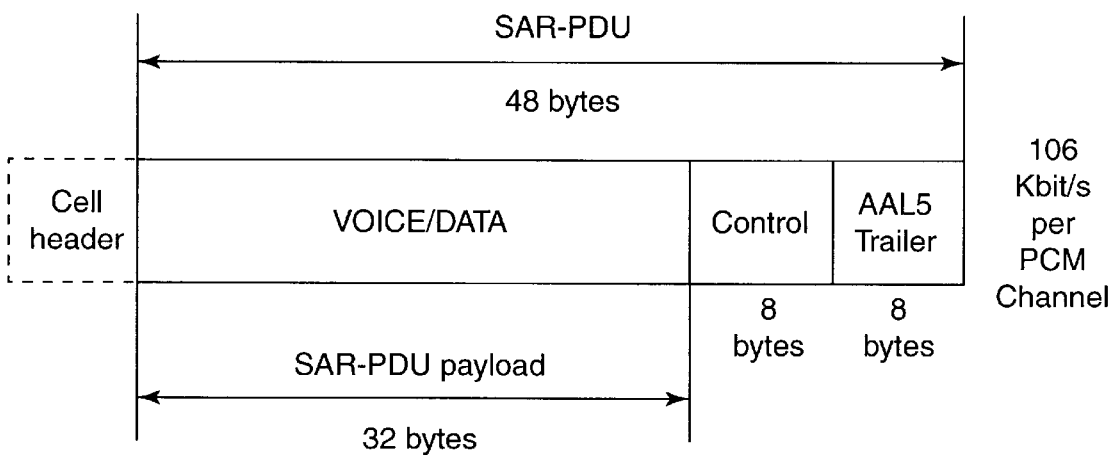
FIG. 15 describes a second AAL-5 proposal to support AAL-1.

Reserved (4 bytes).

a SSCS Trailer Extension (2 bytes) which, as described in FIG. 9, comprises the following field:

Structured Data Transfer (SDT) (2 bytes):

The SDT field or Pointer Field contains a pointer on the the first structure boundary in the current CPCS-PDU. The function permits to recover the alignment of structure inside the CPCS-PDU. The overhead of the 2-byte SSCS trailer extension placed once is every 16 cells equivalent to the overhead of the AAL-1 pointer which is 1 byte long (P format for AAL-1 SAR-PDU) placed once every 8 cells as defined by the AAL-1 standard.

The SSCS trailer extension to support Structure Data Transfer (SDT) is described in FIG. 9. In this particular embodiment, the SSCS trailer (basic plus extension) is 10-byte long, and the SSCS payload is 750-byte long. The SDT function is optional.

a CPCS Trailer (8 bytes): refer to FIG. 6 for more details.

The total overhead of the AAL-5 format defined in the present invention, is 16 bytes every 16 cells and is equivalent to the AAL-1 overhead (8-byte CPCS trailer, 8-byte Basic SSCS trailer and 2-byte SSCS trailer extension). Note that the present invention doesn't require any padding for streaming mode in normal communication mode. The AAL-1 structure is completely mapped into 16 consecutive cells of AAL-5 without padding nor overhead. However, if the communication stops before the end of a complete normal AAL-5 CPCS-PDU of 16 cells then the padding function is used.

Interworking Between AALs

Figure 13:
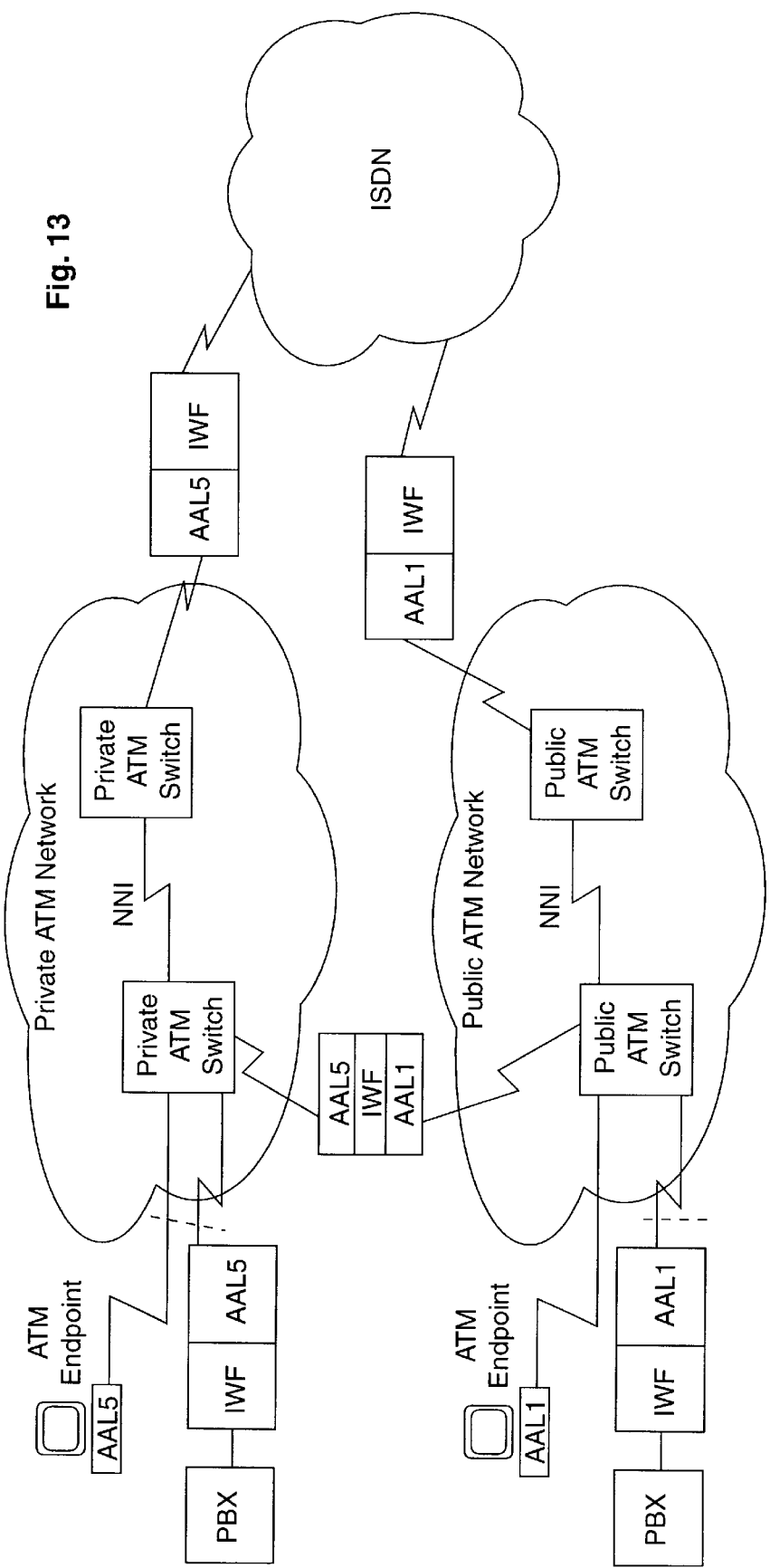
FIG. 13 is an overview of an interworking scenario between AAL-1 and AAL-5.

As described in FIG. 13, ATM end-points and Interworking Functions (IWF) are connected to Private ATM networks using AAL-5. ATM end-points and IWFs are connected to Public ATM network using AAL-1. An Interworking function between the Private and the Public ATM Network must map AAL-1 into AAL-5 format and protocol and vice-versa. This mapping function only applies for the functions which are common to both AALs.

An example of interworking between AAL-1 and AAL-5 with the format and protocol defined in the present invention is now detailed to better understand the claimed mechanism. This example uses the unstructured mode to simplify the description. However, the interworking with the structured mode (SDT) and additional pointers can also be performed with the same method. In unstructured mode, the AAL-5 generates a recurrence of 15 payloads of 48 bytes, and one payload of 32 bytes. On another hand, AAL-1 generates cells, each having a payload of 47 bytes. The Interworking function processes both the AAL header/trailer fields and the AAL payloads. The correspondence of the AAL-1 and AAL-5 payloads is described hereunder.

Correspondence of AAL-1 with AAL-5 Payloads

As shown in FIG. 11, a basic interworking function between AAL-1 and AAL-5 is performed as follows:

transmitting 47 bytes of a first AAL-1 payload named payload A plus 1 byte of a second AAL-1 payload named payload B in a first SAR payload;

transmitting the last (48−n) bytes of a nth AAL-1 payload plus the first n bytes of a (n+1)th AAL-1 payload in a nth AAL-5 SAR payload, transmitting in an (N+8)th AAL-5 SAR payload named payload P the last (48−N−8) bytes of a (N+8)th AAL-1 payload with an AAL-5 SSCS trailer and an AAL-5 CPCS trailer.

In our example N is equal to 8. This method has the disadvantage to add a delay close to the time interval between two cells and requires a memory of 47 bytes.

As shown in FIG. 16, an enhanced interworking function between AAL-1 and AAL-5 is performed as follows:

storing the last (N+8−1) bytes of an initial AAL-1 ATM-PDU payload in a FIFO storage, receiving a first 47 bytes AAL-1 payload names payload A, transmitting in an AAL-5 SAR payload the (N+8−1) bytes previously stored in the FIFO storage with the first (48−N−8+1) bytes of said first AAL-1 payload, and storing the remaining (N+8−2) bytes in said FIFO storage;

receiving a nth 47 bytes AAL-1 payload, transmitting in an AAL-5 SAR payload the (N+8−n) bytes previously stored in the FIFO storage with the first (48−N8+n) bytes of said nth AAL-1 payload, and storing the remaining (N+8−n−1) bytes in said FIFO storage;

receiving a (N+8)th 47 bytes AAL-1 payload named payload P, transmitting in an AAL-5 SAR payload the first (47−N−8+1) bytes of said (N+8)th AAL-1 with the SSCS and CPCS trailers.

storing the remaining (N+8−1) bytes of the (N+8)th AAL-1 ATM-PDU payload in a FIFO storage.

In our example N is equal to 8. This method has the advantage to minimize the delay and requires a FIFO of 15 bytes.

Correspondence of AAL-5 with AAL-1 Payloads

As shown in FIG. 17, the interworking between AAL-5 and AAL-1 is performed as follows:

receiving a 48 bytes AAL-5 SAR payload named payload A, transmitting the fist 47 bytes in an AAL-1 payload, and storing the 48th byte in a FIFO storage;

receiving a nth 48 bytes AAL-5 SAR payload, transmitting the (n−1) bytes previously stored in the FIFO storage with the first (47−n+1) bytes of the nth AAL-5 SAR payload in an AAL-1 ATM-PDU, and storing the n last bytes in the FIFO storage;

receiving the (N+8)th 48 bytes AAL-5 SAR payload named payload P, transmitting the (N+8−1) bytes previously stored in the FIFO storage with the first (47−N−8+1) bytes of the (N+8)th AAL-5 SAR payload in an AAL-1 ATM-PDU;

Correspondence of AAL-1 and AAL-5 Headers and Trailers

To better understand the mapping process of AAL-1 and AAL-5 headers and trailers, three types of fields must be considered:

Fields which are processed locally by the interworking function:

the AAL-1 Sequence Number (SN) which is incremented by one for each AAL-1 cell, the AAL-1 Sequence Number Protection (SNP), the AAL-5 PDU Sequence Number (PSN) which is incremented by one for each AAL-5 SSCS-PDU, the SDT field which is described in the following section.

the AAL-5 CPCS trailer.

Fields which are mapped from one AAL to the other:

the SRTS field which described in the following section.

Fields which don't apply to the interworking:

the AAL-5 Time Stamp provides asynchronous clocking functions for CBR and VBR traffic. This field doesn't apply to AAL-1.

Synchronous Residual Time Stamp (SRTS)

If SRTS is defined on both sides, the Interworking Function maps the SRTS bits from one format to the other.

On the transmission side from AAL-1 to AAL-5, the 8 bits of AAL-1 located in one CSI bit every 2 cells received during a sequence of 16 cells, are stored into one byte of AAL-5 SSCS.

On the other transmission side from AAL-5 to AAL-1, the 8 bits of the AAL-5 SSCS SRTS field are stored in the CSI bits defined on AAL-1 during the next period of 16 cells.

Structured Data Transfer (SDT)

If the Structure Data transfer mode is defined on both sides, the Interworking Function generates the one byte SDT pointer field of AAL-1 once every 8 cells, and the two bytes AAL-5 SDT pointer field once every 16 cells.

SDT defines a procedure with a pointer to delineate the structure boundaries at periodic intervals. The period is 8 cells for AAL1, and 16 cells for the current invention on AAL5. Every structure boundary is not pointed by a pointer since SDT applies for any structure size greater than one byte. The objective is that the receive side be able to recover the start of a structure when an undefined number of cells is lost. The recovery is not performed on the first structure boundary received, but on the first structure boundary pointer by a SDT pointer. The AAL1 SDT procedure is processed on one side of the Interworking function. The AAL5 SDT procedure is processed on other side of the Interworking function. It guarantees that the Interworking function is able to recover the structure boundary when it is lost on any side. As described in FIG. 12, the process is the following:

The AAL-1 SDT protocol requires the generation of a pointer (i.e. P format payload) to provide the SDT block boundary information once in each eight cells associated with an AAL-1 sequence count cycle.

The AAL-5 SDT protocol requires the generation of a pointer to provide the first SDT block boundary associated with an AAL-5 PDU, and is generated in the SSCS trailer extension located in the last cell of an AAL-5 PDU.

On the transmission side from AAL-1 to AAL-5, the Interworking function checks that the structure alignment is maintained on the AAL-1 receive side, and generates the appropriate pointer on the AAL-5 transmit side.

On other transmission side from AAL-5 to AAL-1, the Interworking function checks that the structure alignment is maintained on the AAL-5 receive side, and generates the appropriate pointer on the AAL-1 transmit side.

Advantages

The present invention:

Reduces the cost of ATM adaptors. Hardware and software for implementing the function are more simple than what is required for AAL-1.

Uses AAL-5 SAR and CPCS hardware, which simplifies the interface and doesn't require multiple AALs in adapters.

Can be also implemented in software. The additional processing on top of the existing AAL-5 is very limited and very simple to implement for PCM (Pulse Code Modulation) voice.

can be extended with one cell per AAL-5 PDU. In this case, the method does not use the AAL-5 Streaming Mode Service, and the delivery of corrupted CPCS-SDU can be optional. The same SSCS format can apply. The same functionality is provided with an additional overhead. This extension fits specifically for a campus environment where bandwidth is not expansive.

Provides the same delay and efficiency as AAL-1. The global structure based on 16 cells is completely similar and transparent in term of delay and overhead.

Interworks with AAL-1 with minimum delay and complexity. The AAL-5 structure for 16 cells is specially designed for an easy transfer to AAL-1.

Supports AAL-2 functions for real-time VBR traffic. These functions are implemented on special SSCS-PDU trailer fields.

Is flexible to support additional functions (to be defined). Some fields are reserved in the SSCS-PDU trailer to maintain a better capability for interworking.

While there have been described what are considered to be preferred embodiments of the present invention, variations and modifications to the preferred embodiments will occur to those having skill in the art. Therefore, it is intended that the appended claims shall be construed to include both the preferred embodiments and all variations and modifications that fall within the true spirit and scope of the invention.

What is claimed is:

1. A method for transmitting a Constant Bit Rate (CBR) or Variable Bit Rate (VBR) traffic in a streaming mode using functions of the ATM Adaptation Layer 5 (AAL-5) Common Part Convergence Sublayer (CPCS), in an Asynchronous Transfer Mode (ATM) network comprising a plurality of nodes interconnected with communication links and transmitting said traffic in fixed length ATM Protocol Data Units (ATM-PDUs), said method comprising the steps of:

receiving an ATM-PDU, building a Segmentation and Reassembly Sublayer PDU (SAR-PDUs) by removing the ATM header from the ATM-PDU, building a CPCS Interface Data Unit (IDU) by assembling one or more of SAR-PDUs, delivering the CPCS-IDU not comprising a CPCS-PDU trailer before a complete CPCS-PDU is received, checking the CPCS-IDU including a CPCS-PDU trailer by means of a Cyclic Redundancy Check (CRC) included in the CPCS-PDU trailer:

if the CRC checking determines that the CPCS-IDU is correct:

the CPCS-IDU payload is delivered.

if the CRC checking determines that the CPCS-IDU is incorrect:

the CPCS-IDU payload is delivered, the CPCS-PDU trailer and predetermined protected fields are ignored.

2. The method according to claim 1 wherein said predetermined protected fields include a Service Specific Convergence Sublayer SSCS-PDU trailer for performing the functions of AAL-1 or AAL-2.

3. The method according to claim 2 wherein the CPCS-PDUs have a length equal to (N+8) ATM-PDU payloads and wherein N is equal to the length in bytes of the SSCS-PDU trailer.

4. The method according to claim 3 wherein said SSCS-PDU trailer includes:

a PDU Sequence Number field incremented for each AAL-5 CPCS-PDU transmitted.

5. The method according to claim 4 wherein said SSCS-PDU trailer further includes:

a Time Stamp field comprising the sampling instant of the first byte in the CPCS-PDU.

6. The method according to claim 5 wherein said SSCS-PDU trailer further includes:

a Synchronous Residual Time Stamp (SRTS) field comprising means for having an exact clock available in both ends of a network connection.

7. The method according to claim 2 wherein said predetermined protected fields include a a SSCS-PDU trailer extension comprising:

a Structure Data Transfer (SDT) field comprising means for recovering an alignment of structures inside the CPCS-PDU.

\* \* \* \* \*